US006949130B1

(12) United States Patent
Grey et al.

(10) Patent No.: US 6,949,130 B1
(45) Date of Patent: Sep. 27, 2005

(54) DUST AND DIRT SEPARATION ASSEMBLY

(75) Inventors: Nicholas Gerald Grey, Worcester (GB); Andrew John Kent, Hemel Hempstead (GB)

(73) Assignee: Techtronic Industries Co. Ltd., Tsuen Wan (HK)

( * ) Notice: Subject to any disclaimer, the term of this patent is extended or adjusted under 35 U.S.C. 154(b) by 155 days.

(21) Appl. No.: 10/129,410

(22) PCT Filed: Nov. 3, 2000

(86) PCT No.: PCT/GB00/04218

§ 371 (c)(1), (2), (4) Date: Aug. 14, 2002

(87) PCT Pub. No.: WO01/32066

PCT Pub. Date: May 10, 2001

(30) Foreign Application Priority Data

Nov. 4, 1999 (GB) .................................... 9926009

(51) Int. Cl.[7] ......................... B01D 35/20; B01D 50/00

(52) U.S. Cl. ......................... 55/305; 55/337; 55/459.1; 55/DIG. 3

(58) Field of Search .......................... 55/304, 305, 337, 55/429, 426, 459.1, DIG. 3

(56) References Cited

U.S. PATENT DOCUMENTS

| | | | | |
|---|---|---|---|---|
| 2,684,125 | A * | 7/1954 | Brace | 55/305 |
| 3,667,613 | A | 6/1972 | Angold | |
| 4,099,940 | A | 7/1978 | Mortensen et al. | |
| 4,258,451 | A | 3/1981 | Sommerfeld | |
| 5,090,083 | A | 2/1992 | Wulff | |
| 5,223,005 | A * | 6/1993 | Avondoglio | 95/280 |
| 5,322,534 | A | 6/1994 | Kaiser | |
| 5,603,740 | A | 2/1997 | Roy | |
| 5,681,363 | A | 10/1997 | Tucker et al. | |

FOREIGN PATENT DOCUMENTS

| | | | |
|---|---|---|---|
| DE | 27 09 896 | A1 | 9/1978 |
| DE | 34 13 213 | A1 | 10/1985 |
| DE | 41 37 627 | A1 | 5/1993 |
| DE | 197 04 468 | A1 | 8/1998 |
| EP | 0 860 554 | A2 | 8/1998 |
| FR | 2 736 532 | A1 | 1/1997 |
| GB | 1 436 403 | | 5/1976 |
| GB | 1 471 035 | | 4/1977 |
| GB | 2 156 239 | A | 10/1985 |
| SU | 1750663 | A1 | 7/1992 |

* cited by examiner

*Primary Examiner*—Robert A. Hopkins
(74) *Attorney, Agent, or Firm*—Venable LLP; Robert Kinberg

(57) ABSTRACT

A dust and dirt separation assembly for use in a vacuum cleaner having a housing having a dirt collection chamber, a dirty air inlet, a clean air outlet, and an airflow path existing therebetween, a first separation means for separating articles of dirt from dirty air entering the housing, a filter element for separating smaller particles of dust from the dirty air, a selectively manually operable mechanical actuation mechanism including a snap-acting resilient element that changes from a first stable condition to a second condition when a sufficient force is applied, and an impact member actuable by the mechanical actuation mechanism to strike the filter element thereby dislodging dust particles therefrom to be collected in the dirt collection chamber.

6 Claims, 2 Drawing Sheets

DUST AND DIRT SEPARATION ASSEMBLY

DESCRIPTION OF INVENTION

This invention relates to a dust and dirt separation assembly for use in vacuum cleaners of the kind in which dust and other debris is picked up by suction and entrained in an airflow, and subsequently separated from the air in which it is entrained at least in part by causing the airflow to pass through a filter element.

It is to be understood that such dust and dirt separation may be achieved entirely by passage of dirty air through one or more filter elements, or partly by passage of the air through other separation devices, such as a cyclone, and partly by passage through one or more filters, and the assembly in accordance with the present invention may be used alone or in combination with other filters or other separation devices.

Dust filter elements by their very nature tend to become clogged by the dust they are designed to collect and there have been various proposals for mechanisms intended to shake or otherwise agitate filter elements for the purpose of dislodging collected dust therefrom.

By way of example, EP-A-860554 discloses the use of an intermittently powered actuator to operate an element which moves a filter in a self-propelled street sweeping machine to shake the filter and remove collected dust; GB-A-1471035 discloses a vacuum cleaner with a solenoid operated shaker which is activated by a pressure switch in response to a drop in exhaust air pressure caused by partial blockage of the filter; U.S. Pat. No. 5,090,083 discloses a commercial carpet cleaner with filter tubes that are normally maintained in an extended state by means of springs which are compressible under the action of a manually operable depressor plate so as to enable the filter tubes to be shaken, thereby allowing the collected matter to fall into a hopper; and U.S. Pat. No. 5,681,363 discloses a filter shaking arrangement in which a vacuum cleaner dust bag is held within an elastically deformable frame which is expanded by virtue of air pressure in the filter bag, so that when the airflow is interrupted elastic contraction of the frame shakes the bag to dislodge dust from the filter material.

German patent DE 19704468 describes a dust and dirt separation assembly as part of a stationary vacuum cleaning facility. It comprises a dirt collection chamber, having a dirty air inlet and a clean air outlet with an airflow path therebetween. The airflow path passes through a first separation means for separating larger particles of dirt from the dirty air, in the form of a cyclonic separator, and a second separation means separating smaller particles of dust from the dirty air, in the form of a filter. The filter is cleaned by means of a rotating brush beneath the filter which is electrically driven. The filter is cleaned continually by that brushing action.

It is an object of the present invention to provide a simple and effective mechanism for dislodging dust from a filter element and into a dirt collection chamber, particularly in a vacuum cleaner.

According to a first aspect of the invention there is provided a dust and dirt separation assembly for use in a vacuum cleaner, the assembly having a dirt collection chamber, a dirty air inlet and a clean air outlet with an airflow path therebetween, the air flow path passing through a first separation means for separating larger particles of dirt from the dirty air such that it is collected in the dirt collection chamber, and a filter element for separating smaller particles of dust from the dirty air, characterised in that the assembly further includes a mechanical actuation mechanism and an impact member, the impact member being actuatable via the mechanical actuation mechanism to strike the filter element to dislodge the dust from the filter element and such that the dust is collected in the dirt collection chamber with the larger particles of dirt, the mechanical actuation mechanism being selectively manually operable.

The selectively operable mechanical actuation mechanism may conveniently include a snap-acting resilient element which changes from a first, stable condition to a second condition when a sufficient force is applied.

The resilient element is conveniently spaced from the impact member until actuated, when it snaps into its second condition to strike the impact member before returning to its first condition.

The filter element may comprise a filter body made of a filter material which has non-stick properties to facilitate separation of the dust from the surface thereof the filter element is struck. Conveniently the filter material has a coating of PTFE or the like.

According to a further aspect of the invention there is provided a filter assembly comprising a housing having an air inlet and an air outlet, a filter element disposed in an airflow path between said air inlet and said air outlet, a striker member arranged to be held normally in spaced relation to said filter element, and being movable into contact with the filter element and, an actuating member to cause said striker member to move into contact with, and impact on, said filter element so as to dislodge dust from said filter element.

According to a still further aspect of the invention there is provided a vacuum cleaner including a dust and dirt separation assembly or a filter assembly according to the any of the previous aspects of the invention.

The invention will now be described by way of example only with reference to the accompanying drawings in which:

FIG. 1 diagramatically illustrates an embodiment of dirt and dust assembly in transverse section;

Figure 1:
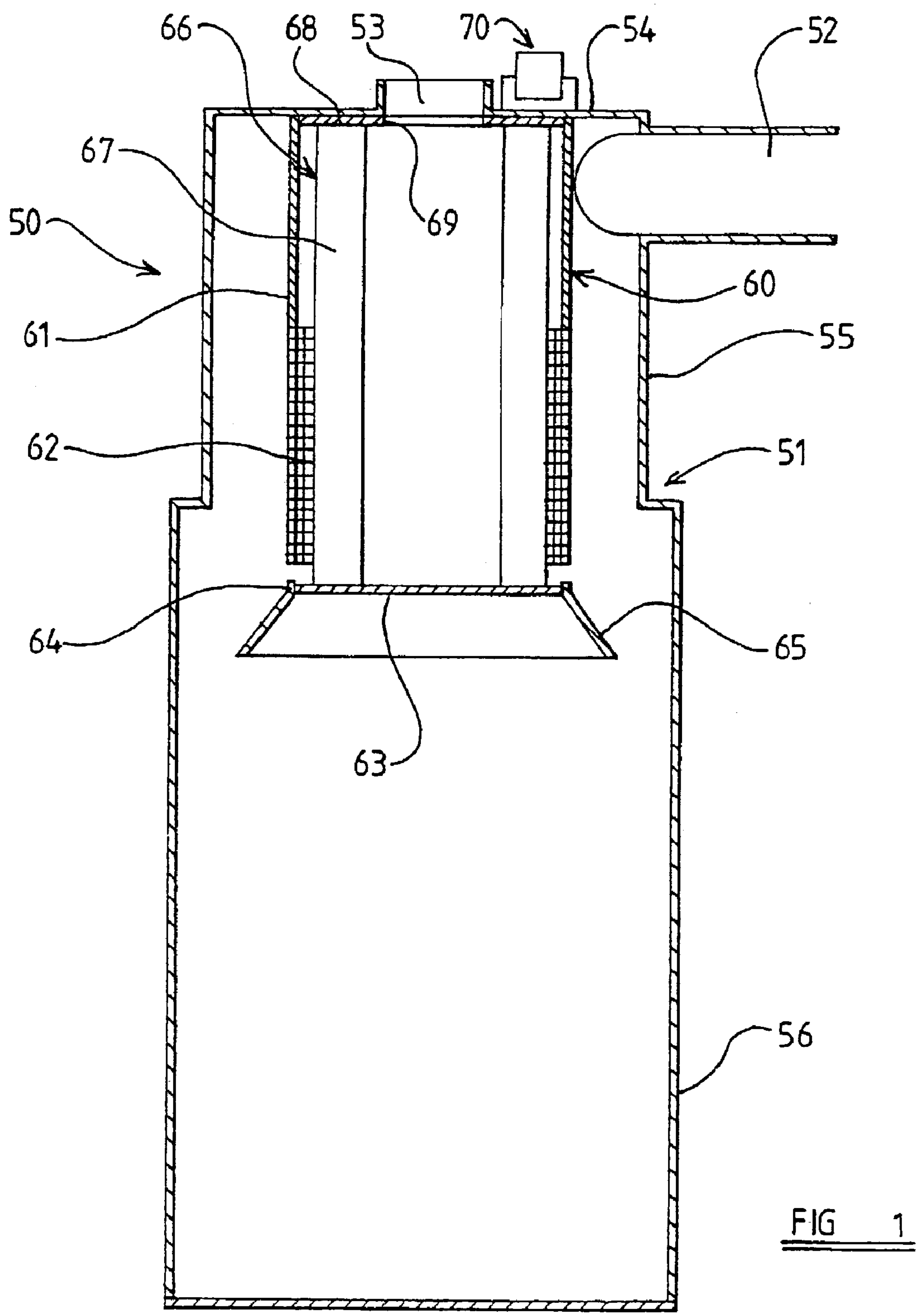
Figure 2:
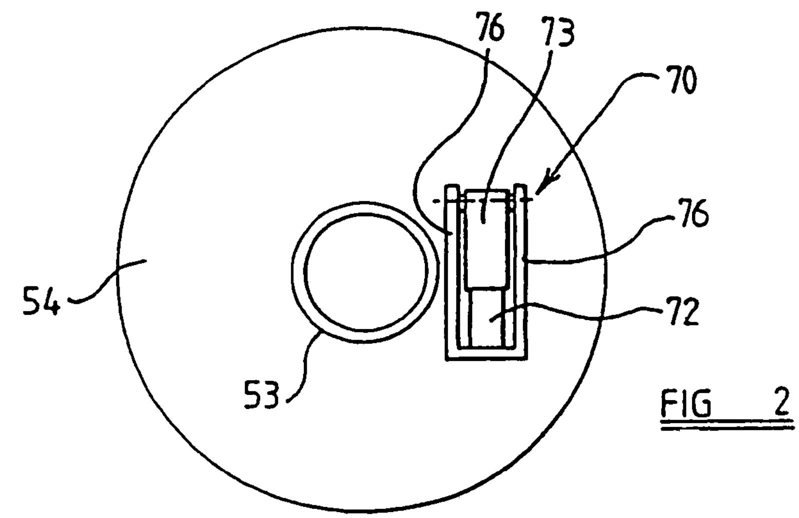
FIG. 2 is a top plan view corresponding to FIG. 1.

Referring to FIGS. 1 to 4, an embodiment of a dirt and dust separating assembly 50 is illustrated. The assembly 50 comprises an outer housing 51 with a tangential air inlet 52 and an axial air outlet 53 in a top wall 54. An upper part 55 of the outer housing 51 acts as a cyclonic separator and a widened, lower part 56 of the outer housing 51 acts as a dirt and dust collection container, which for emptying may be removable from the upper part 55 of the outer housing 51, or have a bottom closure flap which can be opened or removed.

An inner filter housing 60 is located below and around the outlet 53. The filter housing includes an upper cylindrical part 61, which comprises a solid wall, and a lower cylindrical part 62, which comprises a mesh wall through which air can flow from the outer housing 51. The bottom of the filter housing is closed by a bottom plate or support 63, but below the mesh wall part 62 there are openings 64, and around the bottom plate there is a frusto-conical baffle 65.

Located within the filter housing 60 is a filter member or element 66 which comprises a generally cylindrical filter body 67 formed of corrugated filter material having non-stick properties, such as may be provided by a coating of PTFE or other similar material. At its upper end, the filter body 67 is attached to an annular top plate 68, which defines a central opening 69 in register with the outlet 53.

Dirty air is drawn into the outer housing 51 through the inlet 52, and in the upper part 55 the larger particles of dirt and other debris, such as hairs and fibres, are separated due to cyclonic separation, and fall down into the lower part 56 which acts as a dirt collection chamber. The air then passes through the mesh wall part 62 of the filter housing 60 and through the filter body 67 in which the fine dust in the air becomes entrapped. The clean air then passes out of the housing 50 via the outlet 53.

In time the filter body 67 may become clogged with the dust entrapped within it, and require cleaning, but in any event it is desirable to ensure that it is cleaned whenever the container 56 is to be emptied. For this purpose a striker assembly 70 is mounted on the top wall 54 of the outer housing 51, as shown in greater detail in FIGS. 2 to 4.

The top plate 68 of the filter body 67 is formed or provided with an upwardly extending protrusion 71 which, as will become clear below, acts as an impact member for the transmission of a striking force to the filter body 67. The top wall 54 of the outer housing 51 has rectangular recess 57 with a central opening 58 through which the upwardly extending protrusion 71 protrudes. The recess 57 has stepped end walls which defines shoulders 59 which provide location means for a resilient member in the form of a leaf spring 72. As can be seen from FIG. 4, the ends of the leaf spring 72 are located in the corners at the junction between the shoulders 59 and the end walls of the recess 57, and the length of the leaf spring is such that it is held in a stressed condition in which it is bent convexly upwards as shown in FIG. 3 so as to be spaced away from the protrusion 71.

The striker assembly 70 further includes an actuation member 73 which is manually operable by a user of the apparatus as and when required, preferably at least prior to emptying of the container 56. The actuation member 73 comprises a lever 74 mounted at one end on a pivot pin 75 which extends between a pair of raised lugs 76 adjacent to the longitudinal edges of the recess 57. At its other end, the lever 74 is formed with an upwardly directed finger-piece 77 and a downwardly extending nose 78.

Figure 4:
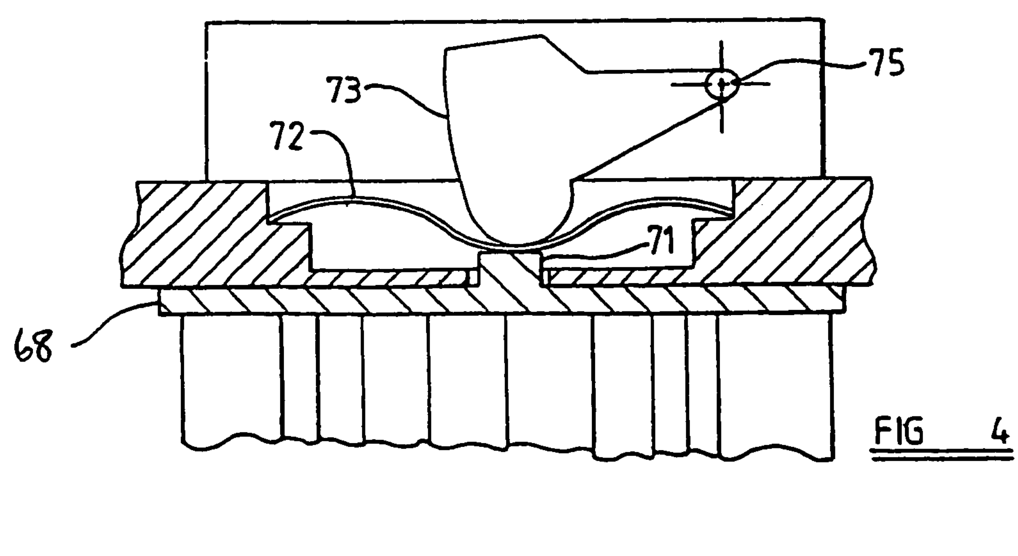

When the actuation member 73 is operated by downward pressure applied to the finger-piece 77 there is initial resistance to movement due to the contact of the nose 78 with the leaf spring 72, but when sufficient pressure is applied to overcome that resistance, the leaf spring snaps through an over-centre condition and the central region moves sharply down, as shown in FIG. 4, into a downwardly convex configuration in which it impacts on the protrusion 71 carried by the top plate 68 of the filter element 66. This results in the filter body 67 being shaken briefly to dislodge the dust entrapped. The dislodged dust is then allowed to fall within the filter housing 60 and out through the openings 64 so as to be delivered over the baffle 65 into the container 56. The dust shaken from the filter body 67 falls to the bottom of the filter support 63 and then through the opening 64 and down into the dirt collection chamber 56. There it falls into the dirt and debris previously collected and at least to some extent mixes into it. In any event when the vacuum cleaner of which the assembly forms a part is used again before the container is emptied further larger dirt will be collected on top of the fine dust. This means that, as before for the previously described embodiment, the fine dust is less likely to puff up in a cloud when the collection container 56 is emptied.

Figure 3:
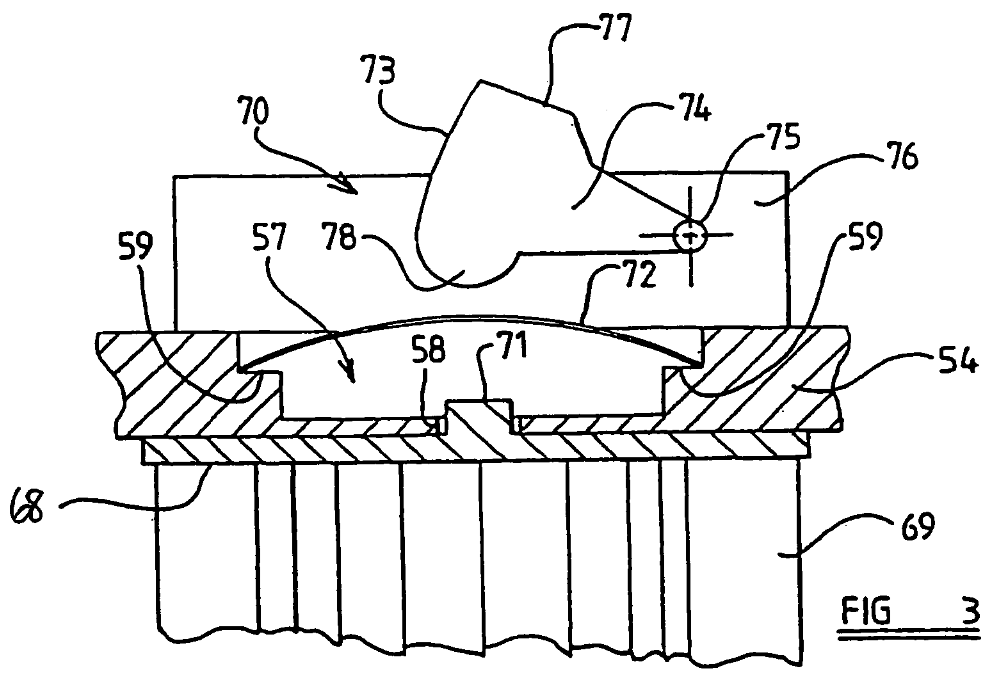
FIGS. 3 and 4 illustrate the action of a filter cleaning mechanism of the embodiment of FIG. 1.

The leaf spring 72 is not stable with the central region in the downwardly convex configuration as shown in FIG. 4, and thus it returns to its original upwardly convex configuration, as shown in FIG. 3, when the finger-piece 77 is released, thereby returning the actuation member 73 to its original position, as shown in FIG. 3. While only the central region of the leaf spring 72 is deflected downwardly into an unstable configuration, it would be possible for the whole leaf spring to adopt a downwardly convex configuration after passing through an over-centre condition but without reaching a stable condition by arranging for contact with the protrusion 71 to occur before a stable configuration is reached. Alternatively or additionally, the actuation member may have a separate return spring.

It will be appreciated that other forms of striker mechanism may be employed, such as a plunger that is spring biased away from the protrusion 71 and held in spaced relation thereto by detent means or the like to provide additional resistance to downward movement of the striker which yields suddenly, or a plunger that is biased into contact with the protrusion 71 and arranged to be lifted away from the protrusion by an actuation member and released, either automatically or manually, so as to strike the protrusion.

While, as described above, the actuation member 73 is provided at the top of the dirt and dust separating assembly 50 (which is removable from the vacuum cleaner apparatus for emptying) and is preferably arranged so as to be accessible for operation at any time by the user, and especially when the assembly is removed for emptying, the arrangement may be such that the actuation member can be operated alternatively or additionally by means of a button provided for that purpose on the exterior of the apparatus. Alternatively it may conveniently be incorporated into a mechanism by which the assembly 50 is released from a body construction of the vacuum cleaner apparatus when it is desired to empty the collection container 56. This means that the filter 66 is always cleaned before the container 56 is emptied, and does not require the user to remember to do so.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof, within the scope of the appended claims.

What is claimed is:

1. A dust and dirt separation assembly for use in a vacuum cleaner comprising:

a housing having a dirt collection chamber, a dirty air inlet, a clean air outlet, and an airflow path existing between the dirty air inlet and the clean air outlet, a first separation means for separating articles of dirt from dirty air entering the housing through the dirty air inlet, the dirt articles being collected in the dirt collection chamber, a filter element being passed through by the airflow path for separating smaller particles of dust from the dirty air, the dust particles being smaller than the dirt articles, a selectively manually operable mechanical actuation mechanism including a snap-acting resilient element, the resilient element changing from a first stable condition to a second condition when a sufficient force is applied thereto, and an impact member actuatable by the mechanical actuation mechanism to strike the filter element thereby dislodging dust particles therefrom, the dust particles being collected in the dirt collection chamber together with the dirt particles.

2. An assembly according to claim 1, wherein the resilient element is spaced from the impact member until actuated, when the actuated resilient element snaps into the second condition to strike the impact member before returning to the first condition.

3. An assembly according to claim 1, wherein the filter element comprises a filter body made of a filter material which has non-stick properties, said non-stick properties facilitating separation of the dust from a surface of the filter body when the filter element is struck by the impact member.

4. An assembly according to claim 3, wherein the filter material has a coating of PTFE.

5. A vacuum cleaner incorporating an assembly according to claim 1.

6. A dust and dirt separation assembly for use in a vacuum cleaner comprising a cyclonic separator having a dirt collection chamber, a dirty air inlet, a clean air outlet, and an airflow path existing between the dirty air inlet and the clean air outlet, the cyclonic separator being operable for separating articles of dirt from dirty air entering the cyclonic separator through the dirty air inlet, the dirt articles being collected in the dirt collection chamber, a filter element being passed through by the airflow path for separating smaller particles of dust from the dirty air, the dust particles being smaller than the dirt articles, a selectively manually operable mechanical actuation mechanism including a snap-acting resilient element, the resilient element changing from a first stable condition to a second condition when a sufficient force is applied thereto, and an impact member actuatable via the mechanical actuation mechanism to strike the filter element thereby dislodging dust particles therefrom, the dust particles being collected in the dirt collection chamber together with the dirt particles.

* * * * *